(No Model.)
S. N. HATHAWAY.
DEVICE FOR PACKING APPLES IN BARRELS.
No. 534,879. Patented Feb. 26, 1895.
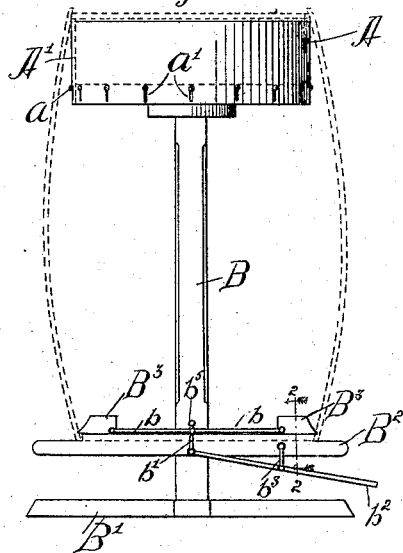
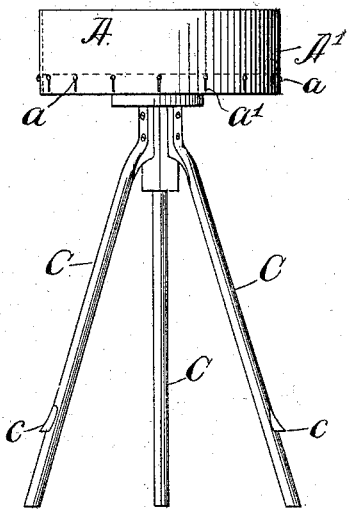
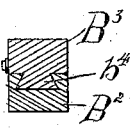
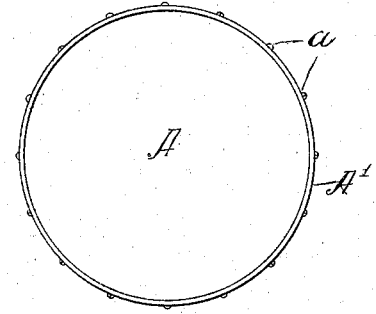
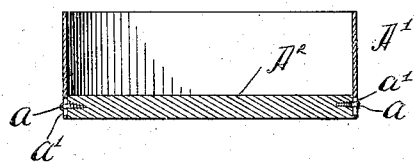
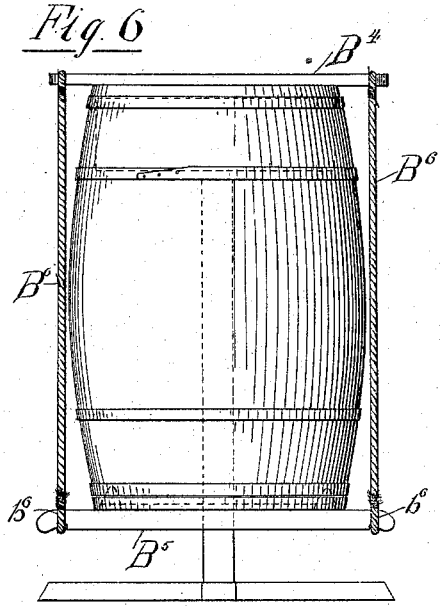
Witnesses:
Clinton Hamlink
Henry H Carter
Inventor:
Samuel N Hathaway
by Dayton, Poole & Brown
his Attorneys

United States Patent Office.

SAMUEL NOYES HATHAWAY, OF CHICAGO, ILLINOIS.

DEVICE FOR PACKING APPLES IN BARRELS.

SPECIFICATION forming part of Letters Patent No. 534,879, dated February 26, 1895.

Application filed September 26, 1894. Serial No. 524,133. (No model.)

*To all whom it may concern:*

Be it known that I, SAMUEL NOYES HATHAWAY, of Chicago, in the county of Cook and State of Illinois, have invented certain new and useful Improvements in Devices for Packing Apples in Barrels; and I do hereby declare that the following is a full, clear, and exact description thereof, reference being had to the accompanying drawings, and to the letters of reference marked thereon, which form a part of this specification.

This invention relates to improvements in devices for use in packing apples and similar fruit in barrels, or other large receptacles of the same general shape.

In the apple shipping industry it is customary to pack the fruit in such manner that the opening of the barrel will disclose an even layer of selected apples uniformly arranged with their stems pointing upward, and consequently presenting the most attractive appearance possible. This is ordinarily accomplished by properly selecting the first apples placed within the barrel and arranging the same in an even layer on the bottom thereof with their stems pointing downward, the remainder of the apples being simply poured in until the barrel is filled, after which it is headed up in the usual manner. Care is then taken in opening the barrel to remove the head which was lowermost, or at the bottom of the barrel, when the same was packed, so that the fruit first exposed will be that which was carefully packed, and which will obviously disclose that even arrangement and attractive appearance desired. Owing, however, to the depth and shape of the ordinary apple barrel the operation of carefully placing the apples at the bottom of the barrel is inconvenient and uncomfortable, since it is impossible to reach into the barrel without great effort, or to properly see what is being accomplished.

A principal object of my present invention is, therefore, to overcome the difficulties in this regard, and to this end it consists in the matters herein set forth and particularly pointed out in the appended claims.

A device embodying my invention comprises in its construction a shallow cylindric receptacle or tray adapted to fit closely within the end of an ordinary apple barrel, and a frame or standard upon which said receptacle is secured and by which it is supported with its upper margin at a greater distance above the ground than the depth of such barrel. The receptacle or tray is made deep enough to contain one or more layers of apples, and in practice is packed full of the selected fruit designed to be placed at the bottom of the barrel, the top layer of apples being evenly arranged in the manner before stated. The barrel to be filled is then inverted over the entire stand and lowered until the bottom head rests upon the filled receptacle, after which by reversing the barrel and stand together and then withdrawing the latter, the carefully packed apples within the receptacle will be deposited in the bottom of the barrel entirely undisturbed and in their desired relative positions.

If found necessary the stand may, as a further improvement and for the purpose of securing it against displacement relatively to the barrel when being reversed therewith, be provided with suitable locking devices adapted to detachably engage and hold the barrel when the latter is inverted over it. Such devices are accordingly hereinafter set forth and claimed as a part of my present improvements, although in its broader aspect the invention is obviously not limited thereto.

In the accompanying drawings, Figure 1 is a side elevation of a device embodying my invention in one form. Fig. 2 is a detail section taken on line 2—2 of Fig. 1. Fig. 3 is a top plan view of the receptacle. Fig. 4 is a sectional elevation thereof. Figs. 5 and 6 are side elevations of forms of the device somewhat modified from that previously shown.

In said drawings A designates a shallow cylindric vessel or receptacle of an exterior diameter substantially equal to the interior diameter of the end of an ordinary apple barrel. The cylindric side wall $A'$ of said receptacle is conveniently made of sheet metal or other thin sheet material secured to a circular bottom $A^2$ preferably made of wood. As herein shown, said side wall $A'$ is adjustably secured to the bottom $A^2$ by means of screws $a$ passing through vertical slots $a'$ in the lower edge of the side wall and entering the periphery of said circular bottom, such construction obviously enabling the capacity of the receptacle to be increased or diminished considerably, within the limits of the slots $a'$, to provide for the varieties of apples of varying size.

As shown in Fig. 1, the standard upon which the receptacle A is supported consists of a single upright column B mounted in a suitable base B′. Near its lower end the column B is provided with a cross piece $B^2$ arranged at a proper height to engage the edge of the barrel when the latter is inverted over the stand with its bottom in contact with the receptacle. At its opposite ends the cross bar $B^2$ is herein shown as provided with laterally movable lugs $B^3$ placed with their outer faces at a distance apart approximating the interior diameter of the end of the barrel. Said lugs are in this instance connected by a toggle mechanism comprising two pivotally connected links $b$, each pivoted at its outer end to one of the lugs $B^3$ and connected by a central link $b'$ to the inner end of a foot lever $b^2$. Said foot lever is pivotally supported midway between its ends by a depending link $b^3$ and projects at its outer end sufficiently far for convenient operation. The outer faces of the lugs $B^3$ are, furthermore, beveled off upwardly and rearwardly, thus forming points at their lower outer corners which are adapted to penetrate the inner face of the barrel and bind the same to the stand; or, if desired, projecting spurs or brads may be provided on the lugs for this purpose. The lugs $B^3$ may be conveniently secured by dove-tailed tongues $b^4$ fitting within corresponding recesses in the upper face of the bar, as shown in cross-section in Fig. 2. With this construction, it will be obvious that by stepping on the outer end of the lever $b^2$ after the barrel is inverted over the stand, the lugs $B^3$ will be projected so as to engage the groove in the end of the barrel and lock the latter to the stand. Both the barrel and stand may then be reversed together without relative displacement, for which purpose the projecting ends of the cross bar $B^2$ may be used as convenient handles. When the barrel has been turned back to its original position the lever $B^2$ may be again shifted to withdraw the lugs $B^3$ and release the stand from the barrel so that it may readily be lifted out of the same, leaving its charge of carefully selected apples at the bottom. A stop pin $b^5$ on the standard B may be used to prevent an excessive movement of the links $b$, and obviously when thrown up against said stop pin the toggle will remain automatically locked until released by the movement of the lever $B^2$.

In the construction shown in Fig. 5 the supporting stand for the receptacle A comprises a plurality of spring legs C secured at their upper ends to the receptacle and diverge downwardly in the same manner as an ordinary tripod. Each of said legs is provided with a spur $c$ located at the proper height to engage the grooved inner end of the barrel when the latter is inverted over the stand, the angular divergence of the legs being such as to normally maintain the spurs $c$ in a circle of slightly greater diameter than that of the end of the barrel. With this construction, it is only necessary to invert the barrel over the stand and force the same down upon the spurs $c$ until by the inward yielding of the legs C said spurs are forced to enter the end of the barrel. The stand will thereupon be locked within the barrel, so that the whole may be readily reversed without relative displacement. In order, however, to release the barrel from the standard it is only necessary to spring the legs C inward until the spurs $c$ clear the barrel groove.

In Fig. 6 I have shown a third modification in which the barrel after being inverted over a standard, similar to that illustrated in Fig. 1, is secured thereto by means of a cross bar $B^4$ detachably connected at its ends to a lower cross bar $B^5$ generally similar to the bar $B^2$ above described. As herein shown the ends of the bar $B^5$ are provided with notches on their under sides and the cross bar $B^4$ is connected with the bar $B^5$ by means of ropes or cords $B^6$ attached to the opposite ends of the cross bar $B^4$ and provided at their lower ends with open loops $b^6$ engaging said notched ends of the bar $B^5$. In the use of this device, it is only necessary to loop one of the ropes $B^6$ over an end of the bar $B^5$, pass the bar $B^4$ across the top of the barrel and slip the other loop $b^6$ over the other end of the cross bar $B^5$.

It will of course be obvious that while herein shown as constructed of wood, the device may, in any or all of its parts, be made of wood, metal or any other material found suitable for the purpose, a standard constructed of suitably bent wire rods being, for example, a convenient form of metal standard possessing many advantages. Moreover while a suitable locking device of either one of the patterns described, or of any other form adapted to accomplish the same purpose, may sometimes be useful, it may oftentimes be dispensed with altogether, since the quantity of apples provided within the receptacle will seldom or never exceed a peck, and will consequently be of a comparatively light weight which may be conveniently handled, especially where two men are engaged in the operation, as is frequently the case.

I claim as my invention—

1. A fruit facer or device for use in packing apples in barrels comprising a shallow receptacle adapted to fit within the end of the barrel, and a standard supporting said receptacle with its upper edge at a height above the ground greater than the depth of the barrel, substantially as described.

2. A fruit facer or device for use in packing apples or similar fruit in barrels comprising a shallow cylindrical receptacle adapted to fit within the end of the barrel, a standard supporting said receptacle with its upper edge at a height above the ground greater than the depth of the barrel, and means for locking the stand and barrel against relative displacement, substantially as described.

3. A device for packing apples in barrels, comprising a shallow receptacle adapted to fit within the end of the barrel and consisting of a circular bottom and a circular wall adjustably secured to said bottom, and a standard supporting the receptacle with its upper edge at a height above the ground greater than the depth of the barrel, substantially as described.

4. A fruit facer or device for use in packing apples in barrels comprising a shallow cylindric receptacle adapted to fit within the end of the barrel, a standard upon which said receptacle is mounted, a cross bar secured on said standard near the base thereof, and means provided upon said cross bar for detachably engaging the lower end of the barrel when inverted over the standard, substantially as described.

5. A fruit facer or device for use in packing apples in barrels comprising a shallow cylindric receptacle, a standard upon which said receptacle is mounted, a cross bar on said standard near the base thereof, laterally movable lugs at the ends of said cross bar adapted to engage the end of the barrel when the latter is inverted over the stand, and a toggle lever mechanism for actuating said lugs, substantially as described.

In testimony that I claim the foregoing as my invention I affix my signature in presence of two witnesses.

SAMUEL NOYES HATHAWAY.

Witnesses:
HENRY W. CARTER,
WILLIAM H. HATHAWAY.